July 25, 1939. H. C. TOEPPER 2,167,163
ARTIFICIAL FISH BAIT
Filed March 14, 1938
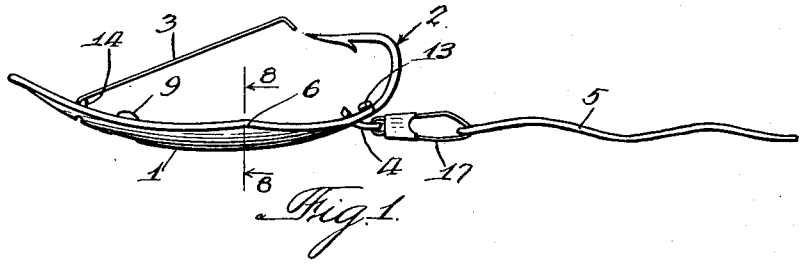
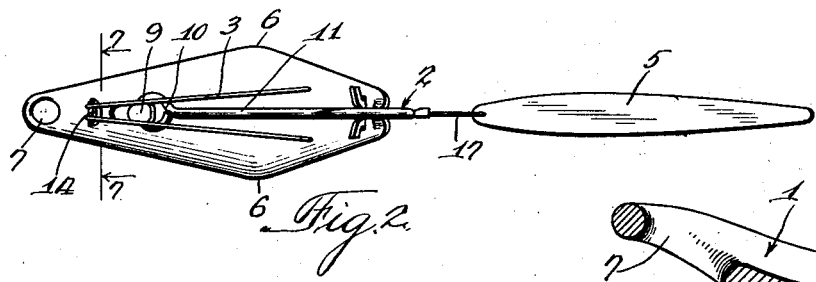
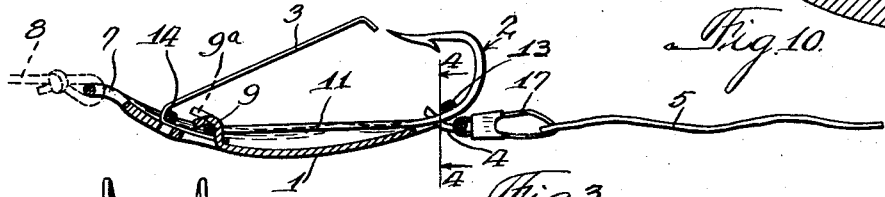
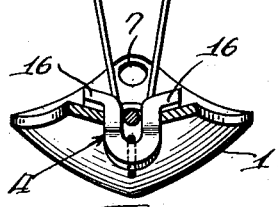
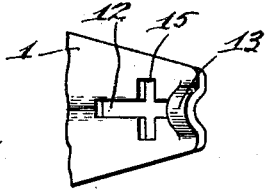
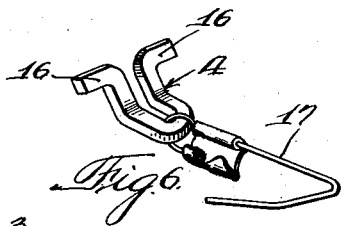
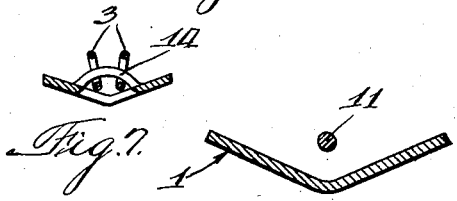
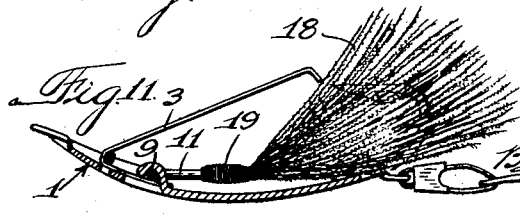

Patented July 25, 1939

2,167,163

UNITED STATES PATENT OFFICE 2,167,163

ARTIFICIAL FISH BAIT

Henry C. Toepper, Des Plaines, Ill.

Application March 14, 1938, Serial No. 195,690

5 Claims. (Cl. 43—39)

This invention relates to artificial fish bait or lure and more particularly to a weedless artificial fish lure of a heavier-than-water spoon type.

It is an object of the invention to provide an artificial bait that is particularly attractive to fish and may easily be manufactured because of its simplicity of construction.

In the manufacture of fishing lures and artificial bait, it is desirable to produce a lure that is attractive to fish. Presumably the main property that makes a spoon lure of the type described in this invention attractive to fish is the life-like appearance displayed when cast or when trolled or pulled through the water. Also it is desirable to produce a lure that is attractive to the eye of the purchaser, since it is well recognized that lures that are attractive to the eye of the purchaser as well as to the fish are more apt to be commercially successful.

The fish lure of this invention may comprise a sheet metal spoon, a hook, a weed guard, a fastener for attaching a spinner or pork rind to the trailing portion of the bait and, if desired, a suitable hackle preferably secured to the shank of the hook and covering the point. The spoon portion of the lure is preferably of a shallow concavo-convex type and curvilinear along its longitudinal axis and preferably is substantially angular in cross section. A spoon made in accordance with this invention will not spin, but instead, when pulled through the water, will exhibit a simultaneous rocking and lateral motion with the concave side upward. This gives a very lifelike wriggle to a pork rind attached thereto and has been found to be particularly effective, as well as attractive to the purchaser.

The hook, weed guard, and fastener for the spinner are readily assembled with the sheet metal spoon member and are constructed to enable manufacture and assembly at a minimum cost. The hook is attached to the spoon portion in such a manner that the curved portion of the hook forms a continuation of the curvature of the spoon, and thus a "streamlined" effect is produced which is very pleasing to the eye.

An important feature of the invention is the provision of an attractive lure of few parts so related that they may easily and quickly be assembled with few tools and without auxiliary fastening members.

Further objects will be apparent from the specification and the appended drawing.

In the drawing:

Fig. 1 is a side elevation of one embodiment of the invention with the hackle omitted for purposes of illustration.

Fig. 2 is a top view of the embodiment illustrated in Fig. 1.

Fig. 3 is a longitudinal axial section through the embodiment illustrated in Fig. 1.

Fig. 4 is a detail cross sectional view taken on a line substantially corresponding to line 4—4 of Fig. 3.

Fig. 5 is a fragmentary top view of the rear end of the spoon and illustrates the intersecting slots to receive the hook and pork rind fastener, respectively.

Fig. 6 is a perspective view of the pork rind holding device.

Fig. 7 is a transverse sectional view taken on a line substantially corresponding to line 7—7 of Fig. 2 and illustrates the means for retaining the forward ends of the weed guards.

Fig. 8 is a transverse sectional view taken on a line substantially corresponding to line 8—8 of Fig. 1.

Fig. 9 is a perspective view of the weed guard wires before being assembled with the spoon.

Fig. 10 is an enlarged sectional view through the forward end of the spoon and illustrates the means for securing a line thereto.

Fig. 11 is a longitudinal section through the spoon and illustrates a suitable hackle secured thereto.

Referring to the drawing in detail, wherein like numerals represent like parts, the embodiment illustrated comprises a sheet metal spoon member 1, a hook 2, a weed guard 3, and a fastener 4 for a spoon or pork rind 5. The spoon member may be of comparatively thick sheet metal and, as previously pointed out, is preferably curvilinear along its longitudinal axis to form a longitudinally concave spoon and angular in cross section and having substantially flat angular sides, as shown in Fig. 8. The spoon member is comparatively wide at approximately one-third of its length, as shown at 6, and tapers toward each end to provide a shape and weight distribution which will cause the peculiar motion previously described and at the same time prevent spinning.

The spoon member 1 preferably contains a large hole 7 adjacent the front end, through which line 8 may extend and be tied in any desired manner. The edges of the hole 7 may be rounded by swedging or otherwise, so that the forward end of the lure is substantially round or arcuate in cross section adjacent the hole 7 to form a ring-like portion and there are no angular or sharp or rough edges which otherwise might cut or wear a line. By this construction, a line may be attached directly to the spoon without the customary leader, link, or swivel, and the spoon is free to oscillate and wobble without material wear on the line.

Near the center of the spoon and somewhat toward the front, an integral tongue or lug 9 may be sheared out to project from the concave surface of the spoon. The tongue 9 is capable of engaging in a loop 10 on the shank 11 of the hook 2. The shank of the hook extends through a longitudinal slot 12 at the rear end of the spoon. The hook portion extends upwardly and forwardly as shown and the rear end of the spoon is formed upwardly at 13 to provide a retaining groove which is, in effect, a continuation of the slot 12. The longitudinal curve of the spoon 1 is thus continued by the hook portion 2, giving a pleasing "streamlined" appearance to the lure.

The weed guard 3 comprises a U-shaped resilient wire, the prongs of which extend almost to the point of the hook when the device is assembled. In manufacturing, a guard is first formed substantially as illustrated in Fig. 9 and, during assembly, the free ends of the guard are passed through a small upwardly-extending loop 14 which may be sheared out of the spoon member whereby it is integral therewith and the closed end of the guard is engaged around the hook retaining lug 9, the forward end of which is then in the raised position shown by dotted lines at 9ᵃ. The lug 9 is then pressed downwardly to retain the hook and weed guard snugly in position and the forwardly extending ends of the weed guard are bent rearwardly to the position illustrated in Fig. 3. By this means, the only tool operation required in assembling the device is that required to bend the lug 9 snugly against the loop of the hook.

In order to secure the pork rind 5 or a suitable spinner to the spoon, a transverse slot 15 is provided intermediate the ends of the slot 12 and, before the hook 2 is inserted in the slot 12 and secured in position by means of the lug 9, the closed end of the U-shaped fastener 4 is inserted through the transverse slot 15 and is supported by laterally extending lugs 16 engaging the inner surface of the spoon adjacent the ends of the transverse slot 15. The hook 2 is then inserted and secured in the manner previously described. The U-shaped member 4 is preferably angular as shown so that the lower end extends rearwardly from the spoon to support a so-called safety pin snap 17 in the manner illustrated in Fig. 6. The pork rind 5 or a suitable spinner may be attached to the snap 17.

Fig. 11 illustrates the hackle secured to the hook. This hackle was omitted from the other views in order that the structure might be more clearly illustrated. The hackle comprises a brush 18 of suitable material, such as feathers, which is securely bound or otherwise fastened to the shank of the hook at 19. This hackle preferably extends rearwardly some distance from the hook and completely encloses the hook. The hackle is not an essential element of the lure but is desirable for some purposes.

It will be apparent from the description herein that the lure may be very easily and cheaply assembled. The hook and weed guard are easily assembled and rigidly secured by means of the lug 9. The fastener or support 4 is merely inserted at the transverse slot 15 and retained therein by the laterally extending lugs 16 and the hook 2.

Modifications may be made without departing from the spirit of the invention, and it is desired, therefore, that the invention be limited only by the prior art and the scope of the appended claims.

Having thus described this invention, what is claimed and desired to be secured by Letters Patent is:

1. A lure comprising a substantially concavo-convex spoon member having means for securing a line to the forward end thereof, a tongue member integral with said spoon and extending from the concave surface thereof, a hook having its loop engaged by said tongue member adjacent the concave surface of said spoon member and extending to the rear and passing through a slot in the rear portion thereof and curving toward the concave surface of said spoon member, and a weed guard member engaged by said tongue member and extending adjacent the concave surface of the spoon and passing through a sheared loop in the forward portion of said spoon and then extending rearwardly from said loop toward the point of said hook.

2. A lure, a substantially concavo-convex spoon having its greater lateral enlargement toward its rear end and having a substantially angular cross section with the apex on the longitudinal axis, means for securing a line to the forward portion of said spoon member, a tongue member integral with said spoon member and extending from the concave surface thereof, a hook engaged by said tongue member and extending to the rear portion and adjacent the concave surface of said spoon member and passing through a slot in the rear portion thereof and curving toward the concave surface of said spoon member, a weed guard member engaged by said tongue member and extending to the forward portion and adjacent the concave surface of said spoon member and passing through a loop in the forward portion of the concave surface of said spoon member and extending rearwardly from said loop toward the barb of said hook, and means supported on the concave surface of the spoon and extending from the convex surface of the spoon for attaching an additional lure.

3. A lure comprising an elongated substantially concavo-convex spoon having means for securing a line to the forward end thereof, said spoon having an elongated longitudinal slot terminating immediately adjacent the edge of the rear end of said spoon and a transverse slot intersecting said first slot, and means supported in said transverse slot and extending therethrough to provide attachment means for an additional lure element.

4. A lure comprising an elongated substantially concavo-convex spoon having means for securing a line to the forward end thereof, said spoon having an elongated longitudinal slot terminating immediately adjacent the edge of the rear end of said spoon and a transverse slot intersecting said first slot, means supported in said transverse slot and extending therethrough to provide attachment means for an additional lure element, a U-shaped member having its closed end extending through said transverse slot to provide a fastener loop, the arms of said member being formed to overlap the inner surface of said spoon, and a hook secured forwardly of said longitudinal slot and extending therethrough and between the arms of said U-shaped member.

5. A lure comprising an elongated substantially concavo-convex spoon having means at its forward end for securing a line thereto, said spoon having an opening therethrough adjacent its rear edge, an inwardly extending integral lug intermediate said opening and the forward end of said spoon, a hook having its loop engaged over said lug adjacent the concave surface of said spoon and its shaft extending through said opening to form substantially a continuation of the lonigtudinal convex curvature of said spoon, and a weed guard looped around said lug under said hook and extending forwardly therefrom and through a raised loop integral with said spoon, said guard being bent rearwardly from said raised loop with its free end adjacent the point of said hook.

HENRY C. TOEPPER.